Nov. 15, 1927. 1,649,516
W. P. DEVINE
PROCESS FOR MANUFACTURING COMPRESSED SPECTACLE FRAME BLANKS
Filed Nov. 19, 1924
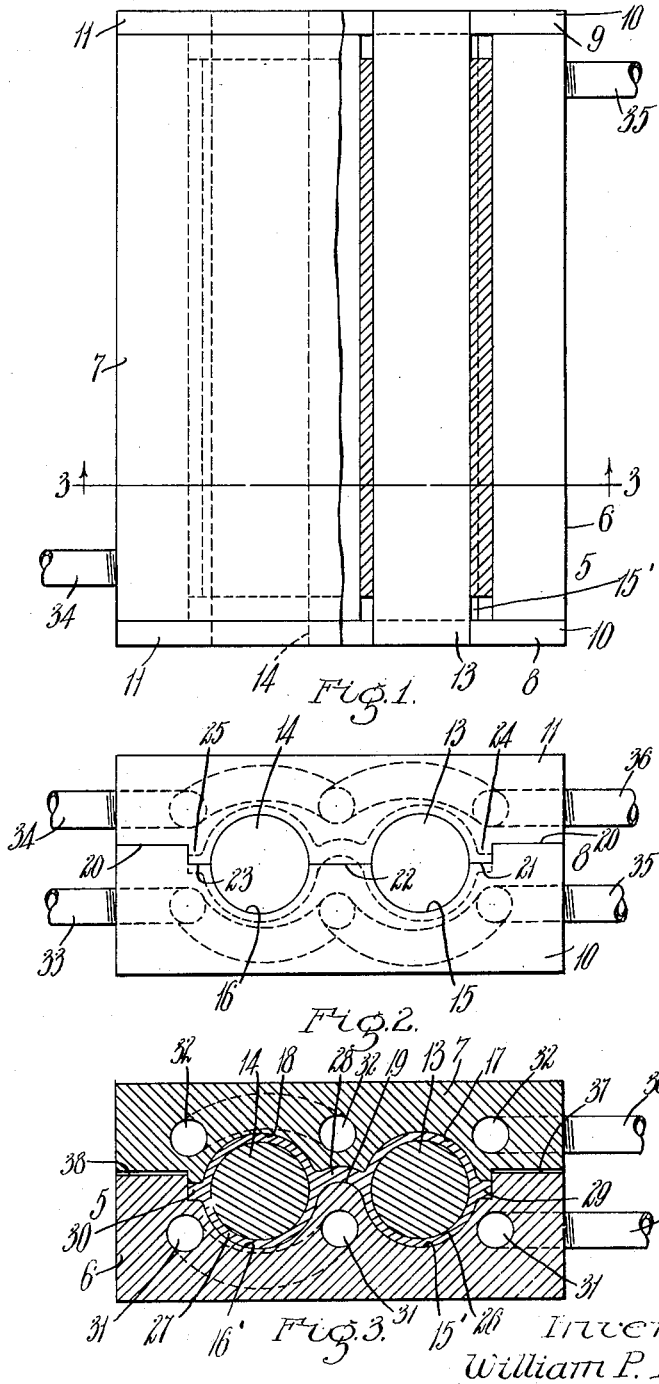
Inventor:
William P. Devine.

Patented Nov. 15, 1927.

1,649,516

UNITED STATES PATENT OFFICE.

WILLIAM P. DEVINE, OF BOSTON, MASSACHUSETTS, ASSIGNOR TO HARRIS KING HALIKMAN, OF BOSTON, MASSACHUSETTS.

PROCESS FOR MANUFACTURING COMPRESSED SPECTACLE-FRAME BLANKS.

Application filed November 19, 1924. Serial No. 750,848.

This invention relates to a process of manufacture of spectacle frame blanks, the same being an improvement upon the process of manufacture such as set forth in Patent No. 1,510,463, issued to me on October 7, 1924 for tubular article for spectacle frames, to which reference may be had.

In the manufacture of spectacle and eye glass frame blanks, it is customary to stamp the frame blanks out of a sheet of celluloid. As will be readily seen, this leads to a great amount of waste and it is the object of this invention to eliminate such waste as in the patent hereinbefore referred to, and also to produce spectacle or eye glass frame blanks of a compressed plastic material, whereby all bubbles, interstices or inequalities of any kind may be eliminated from the tubular article produced by this process, whereby the finished spectacle or eye glass frames will present a smooth polished appearance, free from inequalities, such as small recesses or holes, and moreover, it is the object of the invention to disclose a process whereby the spectacle frame blanks in their finished condition are of a hard and compressed material which will keep its shape in the finished spectacle or eye glass and not become distorted, bent or otherwise rendered undesirable by use.

To these ends the invention consists in the process hereinafter described and particularly set forth in the claims.

Referring to the drawings:—

Figure 1 is a plan view partly broken away and shown in section of a die, whereby certain steps of my improved process may be carried into effect.

Fig. 2 is an end elevation of the same.

Fig. 3 is a transverse section taken on line 3—3, Figure 1.

Like numerals refer to like parts throughout the several views of the drawings.

In the drawings, 5 is a forming die consisting of a lower member 6, an upper member 7 and end plates 8 and 9, each consisting of a lower portion 10 and an upper portion 11. The lower portions 10 of the plates 8 and 9 are affixed to the opposite ends of the lower member 6. The upper portions 11 of the plates 8 and 9 are affixed to the upper member 7 of the die 5.

Supporting arbors 13 and 14 are provided in the die, the opposite ends thereof resting in semi-circular recesses 15 and 16 in the lower portions 10 of the end plates 8 and 9. The lower member 6 is provided with semi-circular bores 15' and 16' extending longitudinally thereof. The under face of the upper member 7 of the die is provided with semi-circular bores 17 and 18 extending longitudinally thereof.

The die is further provided in the lower member with a depressed portion 19 connecting the bores 15' and 16'. The two parts of the die being so formed that when placed together, as illustrated in Figures 2 and 3, the end plates 10 and 11 at the opposite end of the die abut along the lines 20, 21, 22 and 23 and are guided against lateral movement relatively to each other by ears 24 and 25 upon the upper portion of the end plates which project into corresponding recesses formed in the lower portions of each of the end plates. When the two parts of the die are thus placed together, the recesses or bores in the lower and upper members of the die are so proportioned and positioned relatively to each other that a space is left between the upper and lower members of the die and between the pair of arbors 13 and 14, which in cross-sectional contour is the same as that of the spectacle frame blank which it is desired to manufacture and which is shown in cross section in Figure 3 and consists of a pair of tubular members 26 and 27, a bridge 28 connecting the tubular members, and flanges 29 and 30 positioned approximately diametrically opposite the cross bar 28.

The lower member 6 is provided with passages 31 and the upper member 7 is provided with passages 32, through which steam or cold water may be circulated when desired for the purposes hereinafter set forth. These passages are supplied with steam or cold water, as the case may be, through pipes 33 and 34 and the steam or the hot water passes out of the lower and upper members of the die through pipes 35 and 36 respectively so that the die can be heated or cooled as may be desired in a manner well-known to those skilled in the art.

The process of manufacturing compressed spectacle frame blanks is carried out in the following manner:—

An article of celluloid or other plastic material of a cross-sectional contour like that shown in Figure 3, namely, of a pair of tubes 26 and 27 joined together by a bridge 28 and preferably with flanges 29 and 30 on the peripheries of said tubes 26 and 27 respectively, is formed in any suitable manner, preferably by means of an apparatus and in the manner disclosed in an application made by me, Serial No. 729,501, filed August 1, 1924, "Apparatus and process for manufacturing articles of plastic material". The article thus formed is allowed to cool and to partly season for a suitable time, preferably from a week to ten days. It is then cut into lengths, slightly shorter than the distance between the inner faces of the end plates 8 and 9 of the die 5. This article is then softened by placing it in hot water until it becomes plastic. It is then forced over the arbors 13 and 14, as illustrated in Figure 1. The arbors, together with the softening plastic article supported thereon, are then placed in the lower member 6 of the die with the opposite ends of the arbors 13 and 14 resting in the semicircular bores 15 and 16 in the end plates 8 and 9. The upper member 7 of the die, together with the upper portions 11 of the end plates, are forced downwardly until the end plates abut against each other along the lines 21, 22 and 23, as illustrated in Figure 2. With the end plates abutting against each other, there will be slight spaces 37 and 38 left between the upper and lower members of the die and the article of plastic material will be compressed between the upper and lower members of the die to the shape illustrated in Figure 3. At this time steam is circulating through the passages 31 in the lower member of the die and the passages 32 in the upper member of the die. Thus the article of plastic material, while under pressure, is submitted to not only pressure while heated, which closes up any holes or interstices of any kind which may be present in the article, but compresses the article so that when allowed to cool still under pressure, it will be very solid, compact and free from any holes or interstices or recesses of any kind. At the same time that the article is submitted to this pressure under heat in the forming die, the final shape of the article is imparted to it and any little change in the shape of the bridge portion may be performed.

In order to cool the die and the article contained therein under pressure, the steam is replaced by cold water which is circulated through the passages 31 and 32 until the die and the article therein have become thoroughly cooled. The article is subsequently removed from the die and from the arbors and is then again subjected to heat to soften the same and finally is sub-divided transversely thereof into a plurality of sections each of which constitutes a spectacle frame blank.

I claim:

1. The herein described process of manufacturing compressed spectacle frame blanks which comprises forming an article of plastic material of a cross-sectional contour approximately like that of a spectacle frame blank, then allowing it to harden by exposure to the air for a substantial period of time, then heating the article to render it plastic, then placing the plastic heated article on a pair of supports extending through the tubular portions thereof, then placing the article and the tubular supports in a forming die and subjecting the same to pressure and heat, then causing the article to be cooled, then removing the article from the supports and the die and sub-dividing the same into a plurality of sections, each of which constitutes a spectacle frame blank.

2. The herein described process of manufacturing compressed spectacle frame blanks which comprises placing an article of seasoned plastic material of a cross-sectional contour approximately like that of a spectacle frame blank and comprising a pair of tubes and a crossbar joining them together and integral therewith, in a die with a supporting arbor inserted in each of the tubes, and then subjecting the said article to pressure and heat.

3. The herein described process of manufacturing compressed spectacle frame blanks which comprises placing an article of seasoned plastic material of a cross-sectional contour approximately like that of a spectacle frame blank and comprising a pair of tubes and a crossbar joining them together and integral therewith, in a die with a supporting arbor inserted in each of the tubes, then subjecting the said article to pressure and heat and then allowing it to cool.

4. The herein described process of manufacturing compressed spectacle frame blanks which comprises placing an article of seasoned plastic material of a cross-sectional contour approximately like that of a spectacle frame blank and comprising a pair of tubes and a crossbar joining them together and integral therewith, in a die with a supporting arbor inserted in each of the tubes, then subjecting the said article to pressure and heat, then allowing it to cool and then sub-dividing the article transversely thereof into a plurality of sections, each of which constitutes a spectacle frame blank.

5. The herein described process of manufacturing compressed spectacle frame blanks which comprises forming an article of plastic material of a cross-sectional contour approximately like that of a spectacle frame blank, then allowing it to harden by exposure to the air for a substantial period of time, then heating the article to render it plastic, then placing the plastic heated article on a pair of supports extending through the tubular portions thereof, then placing the article and the tubular supports in a forming die and subjecting the same to pressure and heat, then causing the article to be cooled, then removing the article from the supports and the die, then heating the article and sub-dividing the same into a plurality of sections, each of which constitutes a spectacle frame blnak.

6. The herein described process of manufacturing compressed spectacle frame blanks which comprises placing an article of seasoned plastic material of a cross-sectional contour approximately like that of a spectacle frame blank and comprising a pair of tubes and a crossbar joining them together and integral therewith, in a die with a supporting arbor inserted in each of the tubes, then subjecting the said article to pressure and heat, then allowing it to cool, then heating the article to render it plastic, and then subdividing the article transversely thereof into a plurality of sections, each of which constitutes a spectacle frame blank.

In testimony whereof I have hereunto set my hand.

WILLIAM P. DEVINE.